United States Patent
Chapman

(10) Patent No.: US 9,628,663 B1
(45) Date of Patent: Apr. 18, 2017

(54) METHOD AND APPARATUS FOR GENERATING A MULTI-LAYER CORRELATION MARK KEY

(71) Applicant: Xerox Corporation, Norwalk, CT (US)

(72) Inventor: Edward Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/151,245

(22) Filed: May 10, 2016

(51) Int. Cl.
*G06K 15/00* (2006.01)
*H04N 1/32* (2006.01)
*H04N 1/00* (2006.01)
*H04N 1/387* (2006.01)
*G06K 15/02* (2006.01)

(52) U.S. Cl.
CPC ....... *H04N 1/32352* (2013.01); *G06K 15/023* (2013.01); *H04N 1/00838* (2013.01); *H04N 1/32309* (2013.01); *H04N 1/3877* (2013.01); *H04N 2201/0094* (2013.01); *H04N 2201/326* (2013.01)

(58) Field of Classification Search
USPC ........................................ 358/1.14
See application file for complete search history.

(56) References Cited

U.S. PATENT DOCUMENTS

| 2004/0036272 | A1* | 2/2004 | Mathys | B41M 3/14 283/72 |
| 2010/0002267 | A1* | 1/2010 | Mikami | G03G 21/043 358/3.28 |
| 2014/0285612 | A1* | 9/2014 | Uyttendaele | B41M 3/14 347/262 |
| 2014/0339808 | A1* | 11/2014 | Pawlik | G07D 7/128 283/85 |
| 2016/0026827 | A1* | 1/2016 | Ko | G06F 21/6209 713/193 |

FOREIGN PATENT DOCUMENTS

WO 2012162041 * 11/2012 ............ G06K 19/06

* cited by examiner

*Primary Examiner* — Jerome Grant, II

(57) ABSTRACT

A method, non-transitory computer readable medium and apparatus for generating a multi-layer correlation mark key are disclosed. For example, the method includes determining a first pattern of a first layer of a multi-layer correlation mark, determining a second pattern of a second layer of the multi-layer correlation mark and printing a first key that corresponds to the first pattern and a second key that corresponds to the second pattern on a clear print medium to generate the multi-layer correlation mark key, wherein the multi-layer correlation mark key is overlaid on the multi-layer correlation mark to simultaneously decipher the first layer and the second layer of the multi-layer correlation mark.

20 Claims, 4 Drawing Sheets

METHOD AND APPARATUS FOR GENERATING A MULTI-LAYER CORRELATION MARK KEY

The present disclosure relates generally to security printing and, more particularly, to a method and apparatus for generating a multi-layer correlation mark key.

BACKGROUND

Many documents are protected for various different reasons using various different methods. For example, documents can be protected from copying, forging and counterfeiting using different methods including security printing.

Some security printing requires specialty hardware and/or materials. For example, a specialty document can be used for prescriptions where a pharmacist would like to be able to have a good level of confidence that the document is genuine.

Security printing may require a key to decipher the security image that is printed. Some security printing requires multiple different keys to be placed on top of the image and rotated until the image is deciphered. This can be inefficient and time consuming.

SUMMARY

According to aspects illustrated herein, there are provided a method, non-transitory computer readable medium and apparatus for generating a multi-layer correlation mark key. One disclosed feature of the embodiments is a method that determines a first pattern of a first layer of a multi-layer correlation mark, determines the second pattern of the second layer of the multi-layer correlation mark and prints a first key that corresponds to the first pattern and a second key that corresponds to the second pattern on a clear print medium to generate the multi-layer correlation mark key, wherein the multi-layer correlation mark key is overlaid on the multi-layer correlation mark to simultaneously decipher the first layer and the second layer of the multi-layer correlation mark.

Another disclosed feature of the embodiments is a non-transitory computer-readable medium having stored thereon a plurality of instructions, the plurality of instructions including instructions which, when executed by a processor, cause the processor to perform operations that determine a first pattern of a first layer of a multi-layer correlation mark, determine a second pattern of a second layer of the multi-layer correlation mark and print a first key that corresponds to the first pattern and a second key that corresponds to the second pattern on a clear print medium to generate the multi-layer correlation mark key, wherein the multi-layer correlation mark key is overlaid on the multi-layer correlation mark to simultaneously decipher the first layer and the second layer of the multi-layer correlation mark.

Another disclosed feature of the embodiments is an apparatus comprising a processor and a computer-readable medium storing a plurality of instructions which, when executed by the processor, cause the processor to perform operations that determine a first pattern of a first layer of a multi-layer correlation mark, determine a second pattern of a second layer of the multi-layer correlation mark and print a first key that corresponds to the first pattern and a second key that corresponds to the second pattern on a clear print medium to generate the multi-layer correlation mark key, wherein the multi-layer correlation mark key is overlaid on the multi-layer correlation mark to simultaneously decipher the first layer and the second layer of the multi-layer correlation mark.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for generating a multi-layer correlation mark key. As discussed above, documents may be protected for various different reasons using various different methods. For example, documents can be protected from copying, forging and counterfeiting using different methods including security printing.

Security printing often requires a key to decipher the security image that is printed. Some security printing requires a key to be placed on top of the image and rotated until the image is deciphered. Other types of security printing may require the use of multiple keys and may require the keys to be rotated until the image is deciphered. This can be inefficient and time consuming.

However, one type of security printing that uses standard materials such as standard paper, ink and toners is specialty imaging from Xerox®. Currently, the specialty imaging creates a multi-layer correlation mark using different colors, or shades of a single color, of a printer. Currently, when the layers of the multi-layer correlation mark have the same line frequency (but rotated at different angles), a single key may be used. However, the single key has to be rotated to decipher each layer of the multi-layer correlation mark separately.

In another example, when the multi-layer correlation mark uses different line frequencies two different keys may be used to decipher or decode each layer of the multi-layer correlation mark. For example, a first key may be placed on top of the multi-layer correlation mark and rotated until the first security image appears. Then a second key may be placed on top of the same multi-layer correlation mark and rotated until the second security image appears.

Embodiments of the present disclosure provide a novel method and apparatus that generates a multi-layer correlation mark key. A single key can be used to decipher or decode both security images in both layers of the multi-layer correlation mark. In other words, both security images appear simultaneously when the single key is laid on top of the multi-layer correlation mark. As a result, the need for rotating the keys to separately view each layer of the multi-layer correlation mark or generating and using two separate keys is eliminated.

Figure 1:
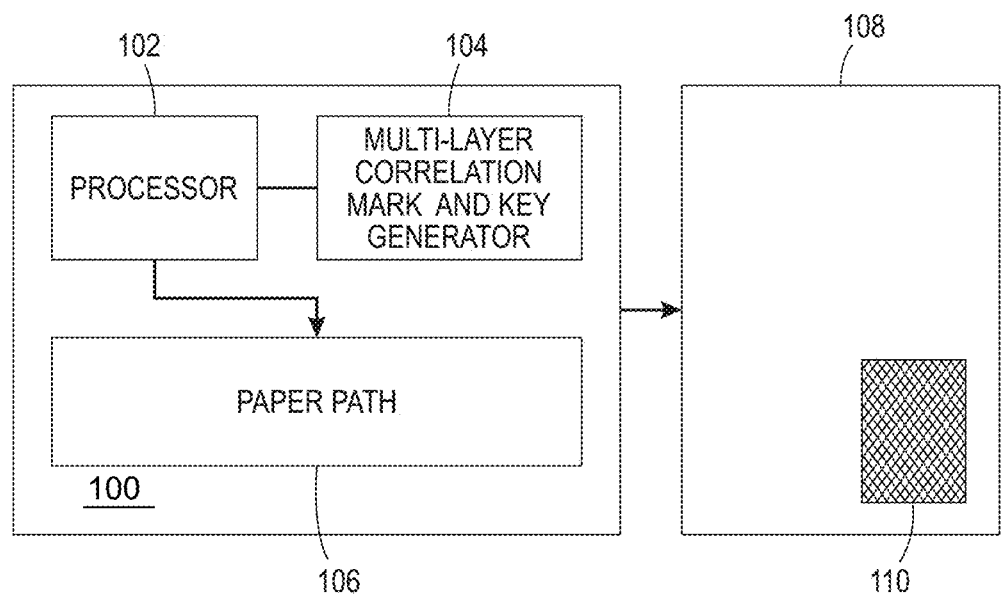
FIG. 1 illustrates an example apparatus of the present disclosure.

FIG. 1 illustrates an example apparatus 100 of the present disclosure. In one embodiment, the apparatus 100 may be a multi-function device (MFD) that has print/scan/fax/copy capabilities, an ink jet printer, a laser printer, and the like. In one embodiment, the apparatus 100 may have a single channel. In other words, the apparatus 100 may only be capable of printing in a single color.

In one embodiment, the apparatus 100 may be a monochrome printer having a single channel that is grayscale, or a color printer having multiple color channels. The apparatus 100 may print in varying degrees of black and white using a single grayscale channel or in different colors using two or more of the multiple color channels.

In one embodiment, the apparatus 100 may include a processor 102, a multi-layer correlation mark and key generator 104 and a paper path 106. In one embodiment, the multi-layer correlation mark and key generator 104 may include instructions stored in a non-transitory computer readable storage medium that are executed by the processor 102 to perform the functions described herein to generate a multi-layer correlation mark 110 and a multi-layer correlation mark key 220 (illustrated in FIG. 2) on a printing medium 108 (e.g., paper, a clear printing medium, and the like).

In one embodiment, the processor 102 may receive an input to generate the multi-layer correlation mark 110 over an Internet Protocol (IP) communication network via a wired or wireless connection (not shown). The processor 102 may generate the multi-layer correlation mark 110 using the multi-layer correlation mark and key generator 104. The multi-layer correlation mark 110 may then be printed onto the printing medium 108 via the paper path 106 under the control of the processor 102. In one embodiment, the paper path 106 may include various hardware devices and modules (e.g., rollers, paper nips, imaging devices, print heads, and the like) used to transport the printing medium 108 and print the multi-layer correlation mark 110.

In one embodiment, the multi-layer correlation mark 110 may comprise a first layer and a second layer. The first layer may have a first pattern of lines and the second layer may have a second pattern of lines that are angled relative to the first pattern of lines. The first layer and the second layer may be printed within the same area on the printing medium 108 to generate the multi-layer correlation mark 110.

Figure 2:
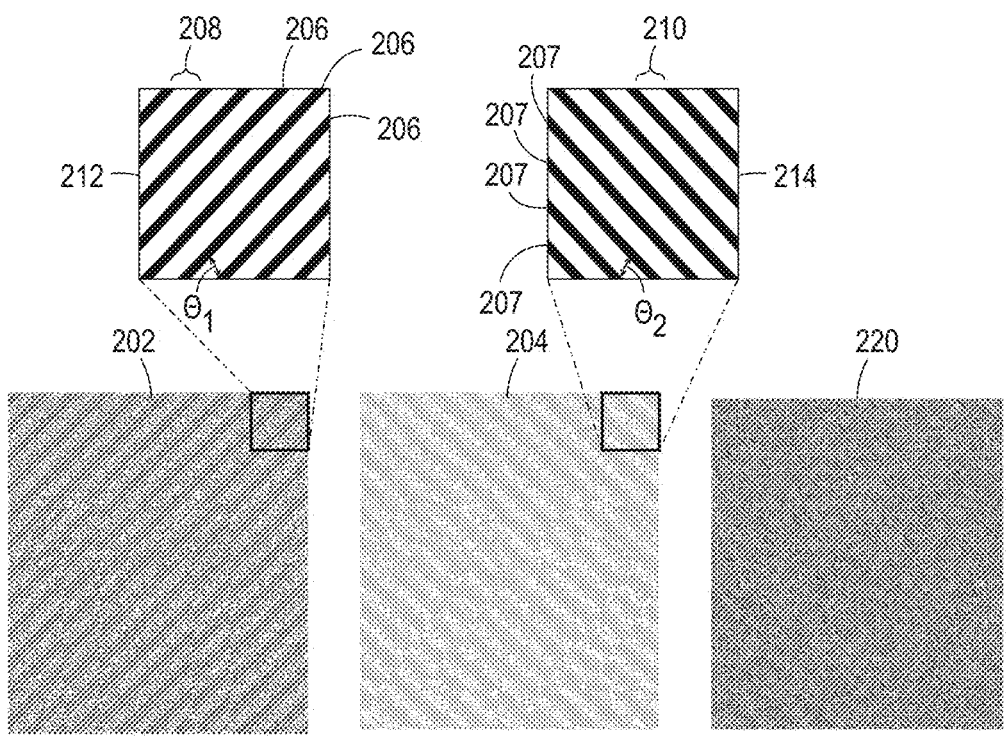
FIG. 2 illustrates an example of the multi-layer correlation mark key of the present disclosure.

In one embodiment, the multi-layer correlation mark and key generator 104 may also generate a multi-layer correlation mark key 220 illustrated in FIG. 2. FIG. 2 illustrates one example of the multi-layer correlation mark key 220 used to decipher both layers of the multi-layer correlation mark 110 simultaneously. In one embodiment, the multi-layer correlation mark key 220 may be printed via the paper path 106 and comprise a combination of a first key 202 and a second key 204.

In one embodiment, the first key 202 may have a predefined frequency of lines 206 illustrated by a periodic spacing 208 between the lines 206 illustrated in a box 210 that is a more detailed view of the first key 202. In one embodiment, the frequency may be defined as an inverse of the periodic spacing 208 between the lines 206. In one embodiment, the periodic spacing 210 may be measured from a middle of one line 206 to a middle of an adjacent line 206. In one embodiment, the frequency may be 75 lines per inch, but could range from 35 to 150 lines per inch for a 600 dots per inch (dpi) resolution. In one embodiment, the first key 202 may have the lines 206 set at a first angle $\theta_1$. In one embodiment, the predefined frequency of lines 206 and the first angle $\theta_1$ may correspond to, or match, the predefined frequency of lines and the angle of the first pattern of lines of the first layer of the multi-layer correlation mark 110.

In one embodiment, the second key 204 may have a predefined frequency of lines 207 as illustrated by a periodic spacing 210 between the lines 207 illustrated in a box 212 that shows a more detailed view of the second key 204. In one embodiment, the periodic spacing 208 may be measured from a middle of one line 207 to a middle of an adjacent line 207. In one embodiment, the second key 204 may have the lines 207 set at a second angle $\theta_2$. In one embodiment, the first angle $\theta_1$ and the second angle $\theta_2$ may be different or offset by a predefined angle. In one embodiment, the predefined frequency of lines 207 and the second angle $\theta_2$ may correspond to, or match, the predefined frequency of lines and the angle of the second pattern of lines of the second layer of the multi-layer correlation mark 110.

The first key 202 and the second key 204 may be combined to generate the multi-layer correlation mark key 220 and printed by the apparatus 100 using a single channel (e.g., a monochrome printer using a single grayscale channel). In one embodiment, the multi-layer correlation mark 110 may be printed on a portion of the printing medium 108 that is a clear print medium such that the security images that are deciphered from the layers of the multi-layer correlation mark 110 may appear through the portions of the clear print medium that do not receive the printed first key 202 and the printed second key 204.

In one embodiment, the first key 202 and the second key 204 may be printed in different colors or in different shades of grayscale. As a result, the images hidden in the multi-layer correlation mark 110 that are deciphered simultaneously by the first key 202 and the second key 204 may be easier to distinguish from one another.

Figure 3:
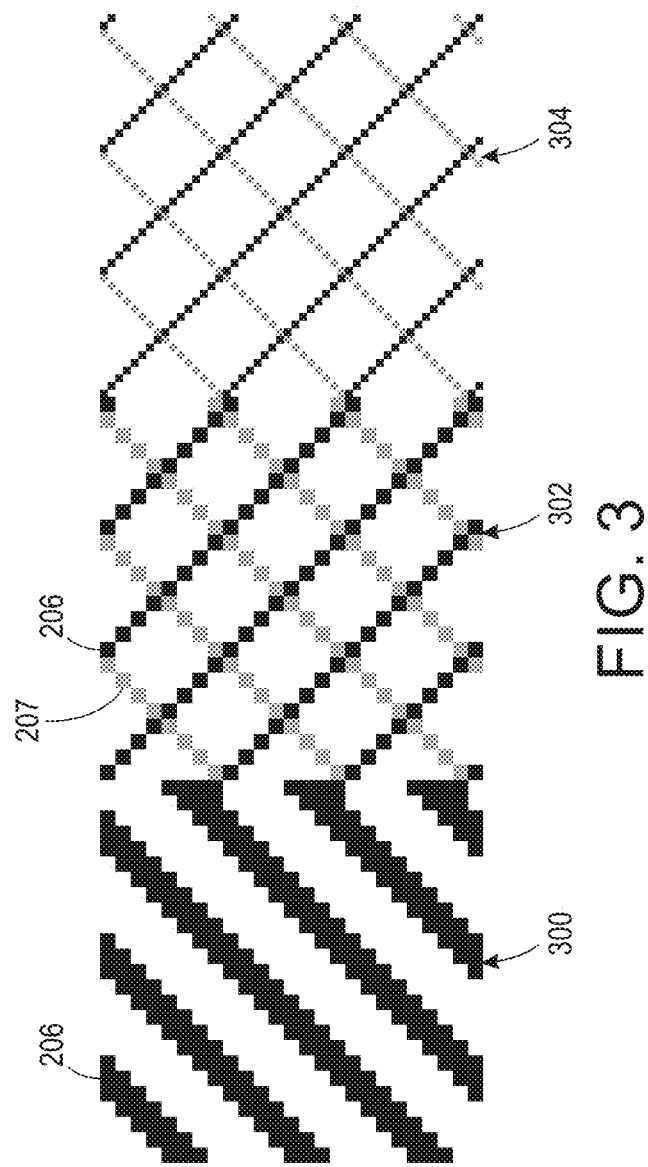
FIG. 3 illustrates an example of the minimizing line width of the multi-layer correlation mark key.

FIG. 3 illustrates minimizing line width of the example multi-layer correlation mark key 220. An example 300 illustrates an original line width of the line 206 of the first key 202. The original line width is the same as the width of the lines of the multi-layer correlation mark 110. However, when simultaneously trying to decipher both images with the multi-layer correlation mark key 220, the original line width may block a portion of one of the images being deciphered. As a result, to allow both images to appear the line width of the lines 206 and 207 of the first key 202 and the second key 204, respectively, should be minimized. As a result, the lines 206 may not block the second image of the multi-layer correlation mark 110 deciphered by the lines 207 and the lines 207 may not block the first image of the multi-layer correlation mark 110 deciphered by the lines 206.

In one embodiment, the minimum line width may be a function of the smallest pixel that can be printed by the printer. In other words, the minimum line width may be a single pixel wide line printed by the printer.

In one embodiment, the line width may be a function of the minimum resolution of a printer that is printing the multi-layer correlation mark key 220. An example 302 illustrates the lines 206 and 207 printed by a 600 dots per inch (dpi) printer and an example 304 illustrates the lines 206 and 207 printed by a 1200 dpi printer.

In one embodiment, the line width may be slightly larger than the minimum line width that can be printed by a printer. For example, the line width may be small enough that both images can be seen when deciphered simultaneously by the multi-layer correlation mark key 220. In other words, the line width of the lines 206 and 207 may be smaller, or thinner, than the line width of the lines in the multi-layer correlation mark 110.

Figure 4:
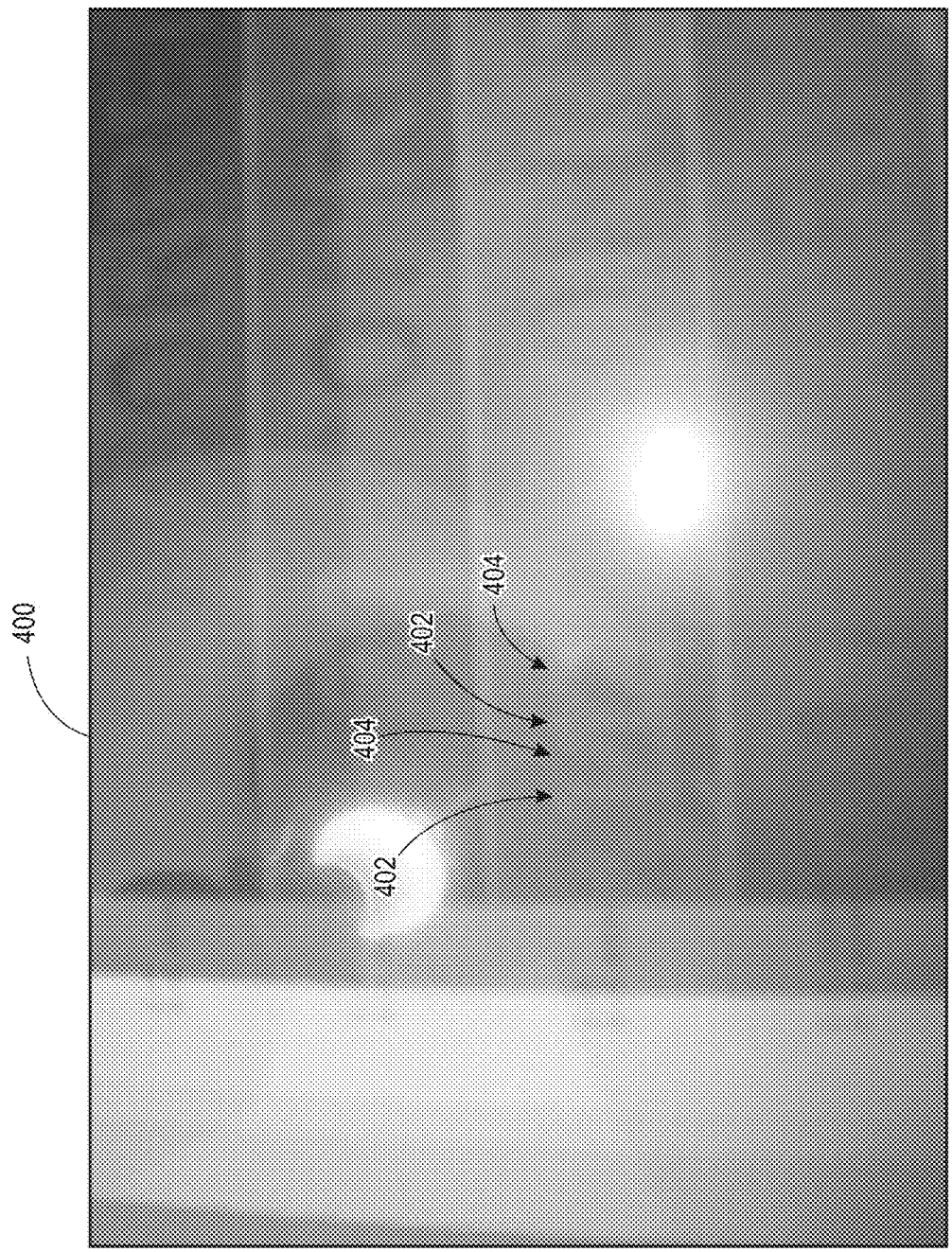
FIG. 4 illustrates an example of the multi-layer correlation mark key overlaid on top of a multi-layer correlation mark.

FIG. 4 illustrates an example 400 of the multi-layer correlation mark key 220 that is overlaid on top of the multi-layer correlation mark 110. In the example 400, both images 402 and 404 of the multi-layer correlation mark 110 are visible when the multi-layer correlation mark key 220 is laid on top of the multi-layer correlation mark 110. For example, the first image 402 may be a series of 1's and the second image 404 may be series of 2's. In other words, a single multi-layer correlation mark key 220 may be used to simultaneously decipher the images 402 and 404 of the multi-layer correlation mark 110 that are within the same area.

In addition, the multi-layer correlation mark key 220 does not need to be rotated to decipher each layer of the multi-layer correlation mark 110. Rather, the multi-layer correlation mark key 220 deciphers and allows both images in the first layer and the second layer of the multi-layer correlation mark 110 to appear simultaneously to the user.

Figure 5:
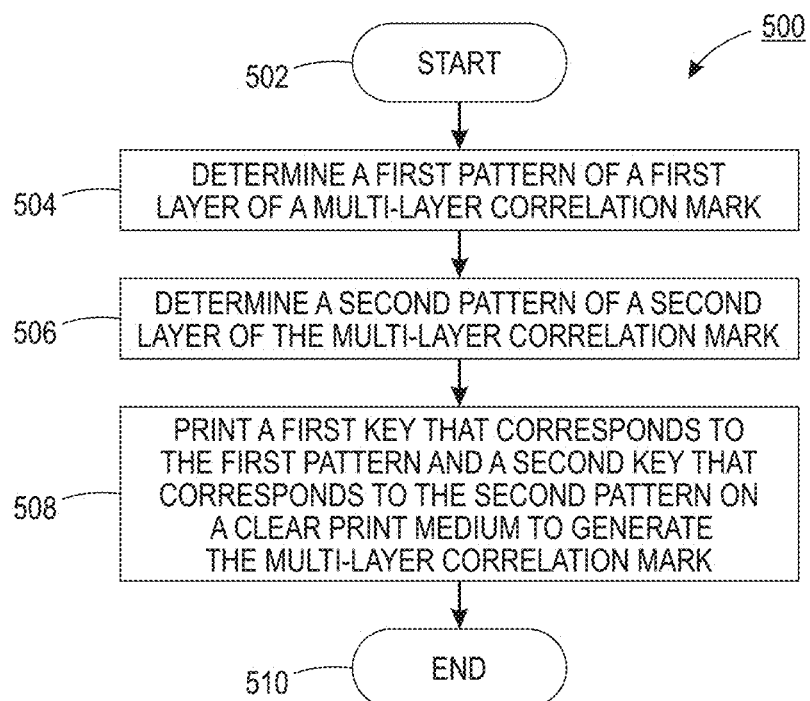
FIG. 5 illustrates a flowchart of an example method for generating a multi-layer correlation mark key.
Figure 6:
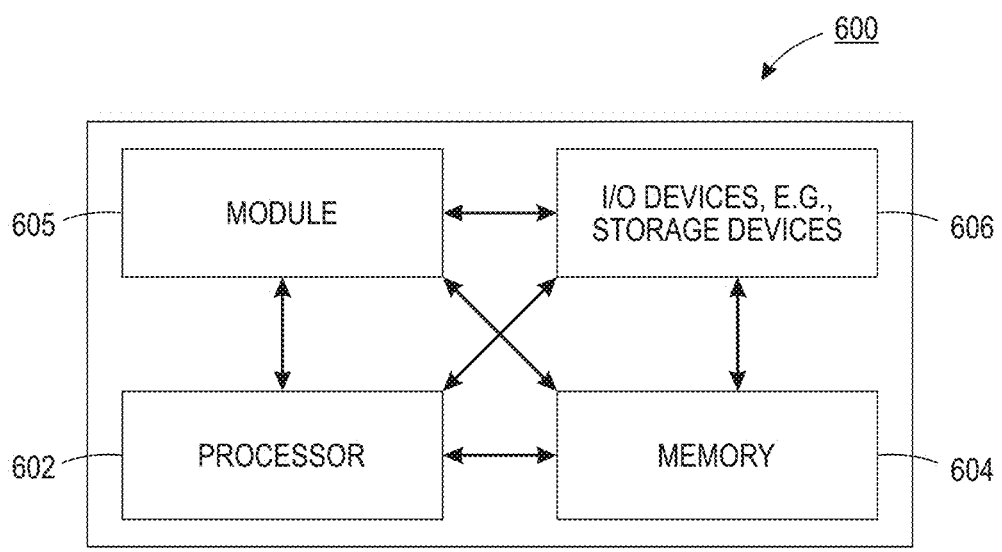
FIG. 6 illustrates a high-level block diagram of a computer suitable for use in performing the functions described herein.

FIG. 5 illustrates a flowchart of an example method 500 for generating a multi-layer correlation mark key. In one embodiment, one or more steps or operations of the method 500 may be performed by the apparatus 100 or a computer as illustrated in FIG. 6 and discussed below.

At block 502, the method 500 begins. At block 504, the method 500 determines a first pattern of a first layer of a multi-layer correlation mark. For example, the first pattern of the first layer may have a plurality of lines that are spaced apart at a particular frequency and printed at a particular angle.

At block 506, the method 500 determines a second pattern of a second layer of the multi-layer correlation mark. For example, the second pattern of the second layer may have a plurality of lines that are spaced apart at a particular frequency and printed at a particular angle. The frequency of the spacing of the lines and the angle of the lines of the second pattern may be different than the frequency and angle of the lines of the first pattern.

In one embodiment, the first pattern of the first layer and the second pattern of the second layer may be located within a common area of a printing medium. In other words, the first pattern and the second pattern may overlap one another.

At block 508, the method 500 prints a first key that corresponds to the first pattern and a second key that corresponds to the second pattern on a clear print medium to generate the multi-layer correlation mark. In one embodiment, the first key and the second key may also be printed within a common area of the clear printing medium. In other words, the first key and the second key may overlap one another.

In one embodiment, the first key may include a plurality of parallel lines that have a frequency and an angle that match the plurality of lines of the first pattern. In one embodiment, the second key may include a plurality of parallel lines that have a frequency and an angle that match the plurality of lines of the second pattern.

In one embodiment, the second key may be rotated relative to the first key when printed. For example, the lines of the second key may be rotated 45 degrees, 70 degrees, 90 degrees, and the like, relative to the lines of the first key. The first key and the second key may be printed in different colors for a color printer or in different shades of gray for a monochrome printer.

In one embodiment, the lines of the first key and the second key may be printed at a minimum width that can be printed by a printer. For example, the minimum width may be a width of a single pixel that is printed by the printer. At block 510, the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application.

FIG. 6 depicts a high-level block diagram of a computer that can be transformed into a machine that is dedicated to perform the functions described herein. As a result, the embodiments of the present disclosure improve the operation and functioning of a multi-function device to generate a multi-layer correlation mark key, as disclosed herein.

As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for generating a multi-layer correlation mark key, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for generating a multi-layer correlation mark key (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for generating a multi-layer correlation mark key (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating a multi-layer correlation mark key, comprising:
    determining, by a processor, a first pattern of a first layer of a multi-layer correlation mark;
    determining, by the processor, a second pattern of a second layer of the multi-layer correlation mark; and
    printing, by the processor, a first key that corresponds to the first pattern and a second key that corresponds to the second pattern on a clear print medium to generate the multi-layer correlation mark key, wherein the multi-layer correlation mark key is overlaid on the multi-layer correlation mark to simultaneously decipher the first layer and the second layer of the multi-layer correlation mark.

2. The method of claim 1, wherein the printing further comprises:
    minimizing, by the processor, a width of each line in the first pattern to a minimum width associated with a printer that performs the printing; and
    minimizing, by the processor, a width of each line in the second pattern to the minimum width associated with the printer that performs the printing.

3. The method of claim 2, wherein the minimum width comprises a width of a single pixel.

4. The method of claim 1, wherein the second key is printed in a different color than the first key.

5. The method of claim 1, wherein the first key comprises a plurality of parallel lines at a first predefined angle and at a first predefined frequency that match the plurality of parallel lines of the first pattern at the first predefined angle and at the first predefined frequency.

6. The method of claim 1, wherein the second key comprises a plurality of parallel lines at a second predefined angle and at a second predefined frequency that match the plurality of parallel lines of the second pattern at the second predefined angle and at the second predefined frequency.

7. The method of claim 1, wherein the second key is rotated by a predefined angle relative to the first key when printed on the clear print medium.

8. The method of claim 7, wherein the predefined angle comprises 90 degrees.

9. A non-transitory computer-readable medium storing a plurality of instructions, which when executed by a processor, cause the processor to perform operations for generating a multi-layer correlation mark key, the operations comprising:
    determining a first pattern of a first layer of a multi-layer correlation mark;
    determining a second pattern of a second layer of the multi-layer correlation mark; and
    printing a first key that corresponds to the first pattern and a second key that corresponds to the second pattern on a clear print medium to generate the multi-layer correlation mark key, wherein the multi-layer correlation mark key is overlaid on the multi-layer correlation mark to simultaneously decipher the first layer and the second layer of the multi-layer correlation mark.

10. The non-transitory computer-readable medium of claim 9, wherein the printing further comprises:
    minimizing a width of each line in the first pattern to a minimum width associated with a printer that performs the printing; and
    minimizing a width of each line in the second pattern to the minimum width associated with the printer that performs the printing.

11. The non-transitory computer-readable medium of claim 10, wherein the minimum width comprises a width of a single pixel.

12. The non-transitory computer-readable medium of claim 9, wherein the second key is printed in a different color than the first key.

13. The non-transitory computer-readable medium of claim 9, wherein the first key comprises a plurality of parallel lines at a first predefined angle and at a first predefined frequency that match the plurality of parallel lines of the first pattern at the first predefined angle and at the first predefined frequency.

14. The non-transitory computer-readable medium of claim 9, wherein the second key comprises a plurality of parallel lines at a second predefined angle and at a second predefined frequency that match the plurality of parallel lines of the second pattern at the second predefined angle and at the second predefined frequency.

15. The non-transitory computer-readable medium of claim 9, wherein the second key is rotated by a predefined angle relative to the first key when printed on the clear print medium.

16. The non-transitory computer-readable medium of claim 15, wherein the predefined angle comprises 90 degrees.

17. A method for generating a multi-layer correlation mark key, comprising:
    determining, by a processor, a first pattern of a first layer of a multi-layer correlation mark, wherein the first pattern comprises a first plurality of lines that are set at a first predefined angle and a first predefined frequency;
    determining, by the processor, a second pattern of a second layer of the multi-layer correlation mark wherein the second pattern comprises a second plurality of lines that are set at a second predefined angle and a second predefined frequency;
    determining, by the processor, a minimum printing width of a printer used to generate the multi-layer correlation mark key;

minimizing, by the processor, a width of the first plurality of lines and the second plurality of lines to the minimum printing width;

printing, by the processor, a first key comprising a plurality of first key lines having the minimum printing width at the first predefined angle and at the first predefined frequency on a clear print medium; and printing, by the processor, a second key comprising a plurality of second key lines having the minimum printing width at the second predefined angle at the second predefined frequency on the clear print medium, wherein the second key with rotated 90 degrees relative to the first key and printed within a same area as the first key on the clear print medium to generate the multi-layer correlation mark key.

18. The method of claim 17, wherein the first key and the second key are printed in different colors.

19. The method of claim 17, wherein the minimum printing width comprises a width of a single pixel that is printed by the printer.

20. The method of claim 17, wherein the multi-layer correlation mark key is placed on top of the multi-layer correlation mark to simultaneously decipher the first layer and the second layer of the multi-layer correlation mark.

\* \* \* \* \*